United States Patent [19]
Lee

[11] Patent Number: 5,910,209
[45] Date of Patent: Jun. 8, 1999

[54] SMOKELESS BARBECUE DEVICE

[76] Inventor: Mong-Yu Lee, No. 182, Chienfeng Rd. Kangshan Chen, Kaohsiung Hsien, Taiwan

[21] Appl. No.: 09/008,208

[22] Filed: Jan. 16, 1998

[51] Int. Cl.⁶ .............................. A47J 37/00; A47J 37/04; A47J 37/07
[52] U.S. Cl. ................................ 99/450; 99/482; 99/516; 126/9 R; 126/25 R
[58] Field of Search ...................... 99/339, 340, 444–446, 99/400, 401, 447, 449, 450, 481, 482, 516, 534; 126/25 R, 299 R, 41 R, 299 D, 9 R, 299 E, 9 B, 39 R, 21 A, 39 G, 25 C; 426/523, 474, 438; 55/436, 440, 467, 472, 509, DIG. 36

[56] References Cited

U.S. PATENT DOCUMENTS

| | | | |
|---|---|---|---|
| 1,837,924 | 12/1931 | Rutherford | 99/482 X |
| 2,894,448 | 7/1959 | Henderson et al. | 99/444 |
| 3,299,800 | 1/1967 | Angelo | 99/417 |
| 4,020,322 | 4/1977 | Muse | 99/450 X |
| 4,300,444 | 11/1981 | Muse | 99/448 |
| 4,439,459 | 3/1984 | Swartley | 426/438 |
| 4,581,989 | 4/1986 | Swartley | 99/346 |
| 4,823,684 | 4/1989 | Traeger et al. | 99/447 |
| 4,957,039 | 9/1990 | Reyes | 99/340 |
| 5,168,796 | 12/1992 | Porton et al. | 99/340 |
| 5,313,877 | 5/1994 | Holland | 99/400 |
| 5,404,801 | 4/1995 | Holland | 99/482 |
| 5,531,154 | 7/1996 | Perez, III | 99/340 |

*Primary Examiner*—Timothy F. Simone

[57] ABSTRACT

A smokeless barbecue device includes a casing having a water tank disposed to a lower end thereof and a food processing device disposed in an open top thereof. A meshed member is disposed transversely in the casing and below the food processing device. A pump is disposed to the water tank and from which a pipe extends having a plurality of sprays disposed thereto which are located above the meshed member. At least one ventilator is disposed to the casing and located below the meshed member, and a valve device is disposed to the water tank.

8 Claims, 6 Drawing Sheets

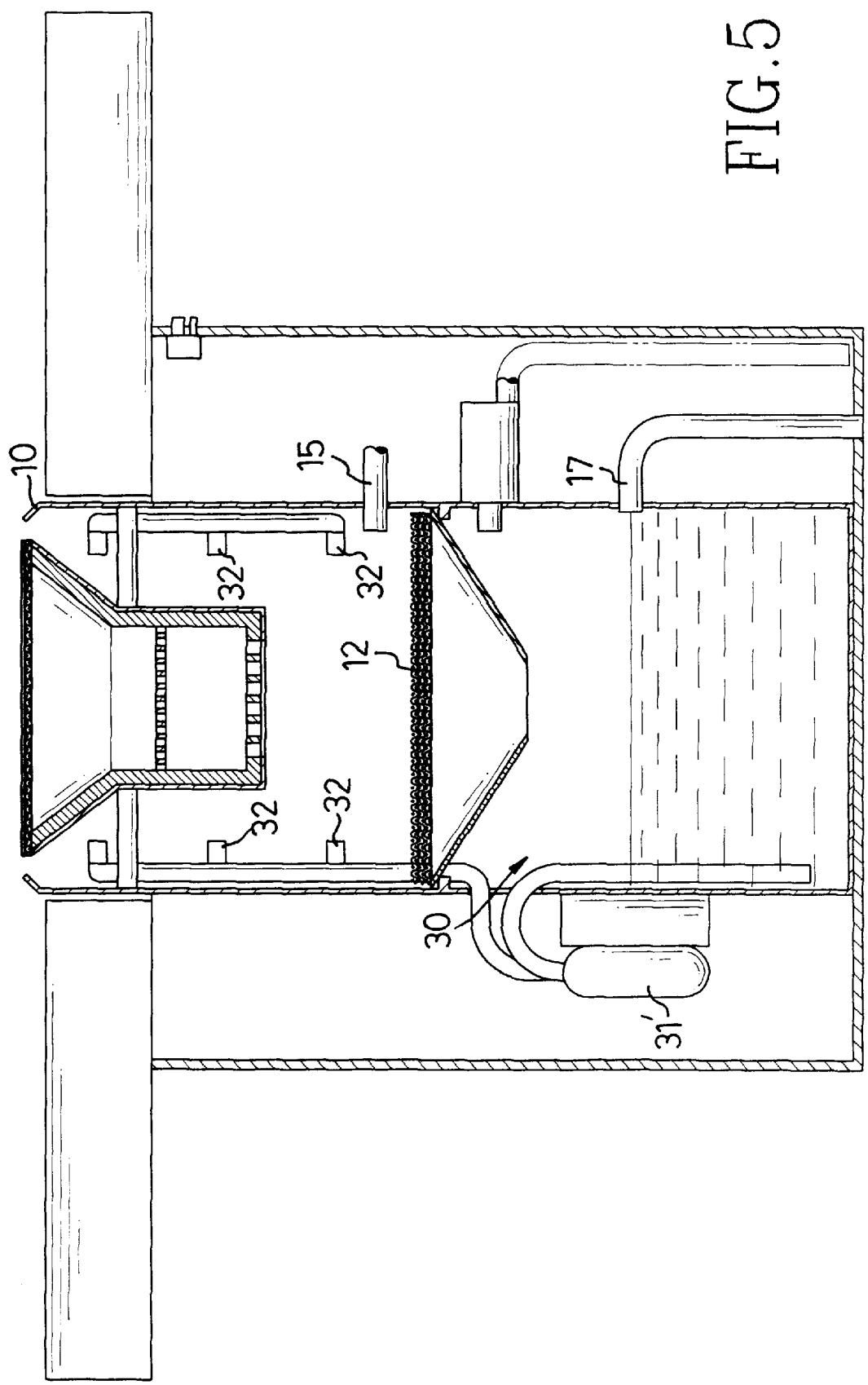

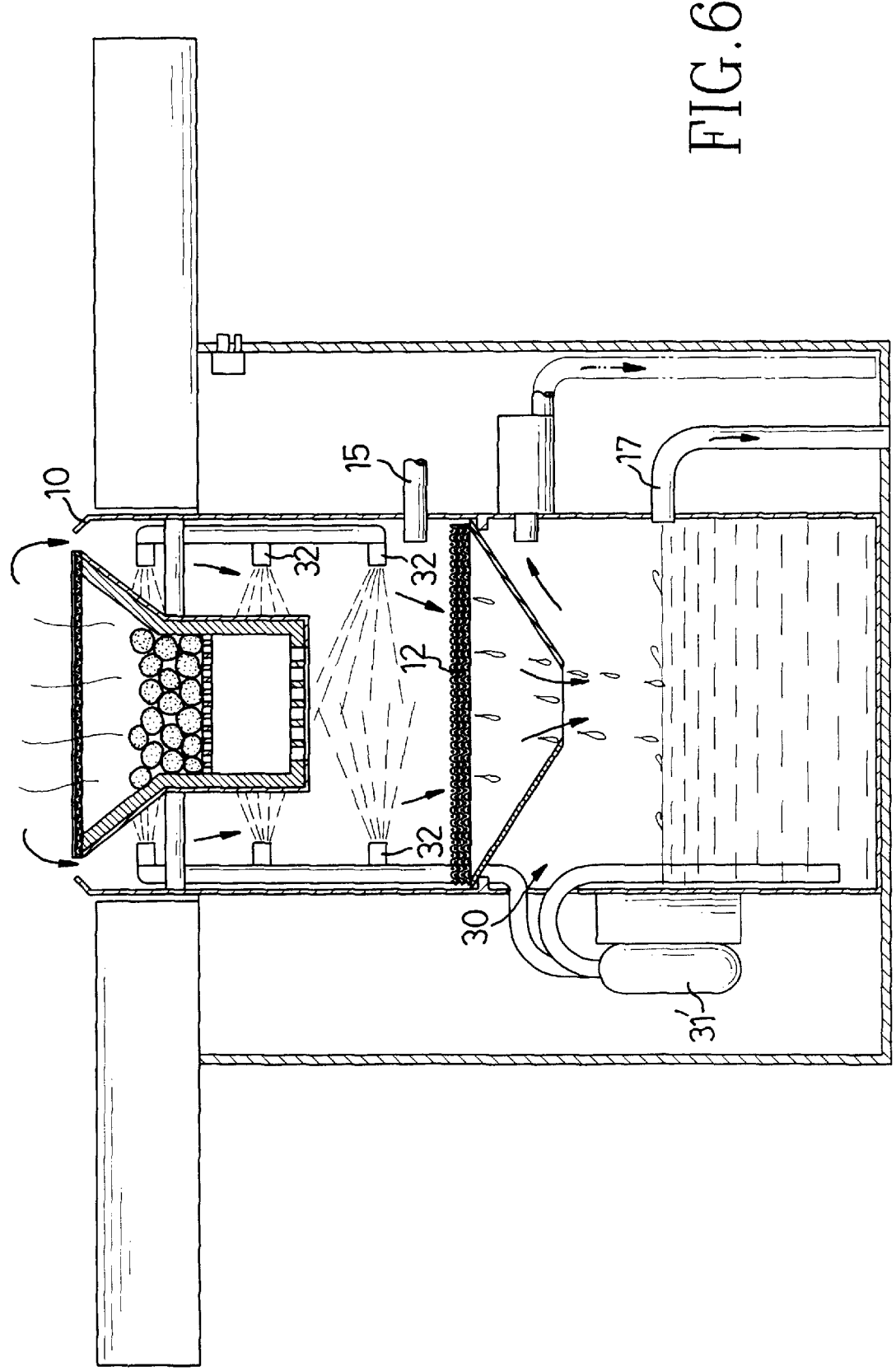

Smokeless Barbecue Device

BACKGROUND OF THE INVENTION

1. Field of the Invention

The present invention relates to a barbecue device and, more particularly, to a smokeless barbecue device having a coal supporting means below which a water tank is disposed, a plurality of sprays disposed between the tank and the coal supporting member and two ventilators disposed above the tank.

2. Brief Description of the Prior Art

FIG. 1 shows a conventional smokeless barbecue device which has a casing 51 disposed in a table 50 with a coal supporting means 53 disposed in the casing 51. A meshed grate 531 is disposed transversely in the coal supporting means 53 so that hot coals 532 can be put on the meshed grate 531. A barbecue grill 56 is supported above the coal supporting means 53 and flush with the table 50 such that food can be put on the barbecue grill 56. A frame 52 is disposed under the table 50 and has a tubular portion 521 extending therefrom so as to receive the casing 51 therein. An annular space 523 is defined between the tubular portion 521 and the casing 51 and communicates with a pipe 60 to which a ventilator 54 is disposed so that smoke will be sucked by a downward flow produced from the ventilator 54 and is removed via the pipe 60. A separating plate 58 and a water container 59 are respectively disposed below the coal supporting means 53 so that debris of coals and food will drop to the water container 59. When using the barbecue device, a user may operate a switch 61 disposed on the frame 52 to actuate the ventilator 54 so that smoke will be sucked immediately into the annular space 523.

However, the smoke produced from the coals 532 and the food includes carbon and grease particles, both of which will adhere to the blades of the ventilator 54 and an inner periphery of the pipe 60 which is a particular problem when cleaning these parts of the barbecue device. Furthermore, referring to FIG. 2, a barbecue restaurant has to dispose many pipes underground and each of which should be manufactured of special material so as to bear high temperature for the smoke passing therethrough. At least one extra ventilator 62 with a large horse-power is needed to suck the smoke from the pipes underground. All of the types of equipment mentioned above are expensive.

The present invention intends to provide an improved smokeless barbecue device to mitigate and/or obviate the above-mentioned problems.

SUMMARY OF THE INVENTION

The present invention provides a smokeless barbecue device which includes a casing having an open top within which a food processing means is fixedly disposed. A water tank is disposed below the food processing means and has a pump disposed thereto which has at least one pipe extending therefrom. The pipe has a plurality of sprays disposed thereto so that water in the water tank is sprayed from the sprays via the pipe. A valve means is disposed to the water tank.

A meshed member is transversely disposed in the casing and located below the food processing means. The sprays are located above the meshed member. At least one ventilator is disposed to the casing and located below the meshed member.

It is an object of the present invention to provide a smokeless barbecue device which has sprays to condense smoke and odor and to collect carbon and grease particles in a water tank.

It is another object of the present invention to provide a smokeless barbecue device which reduces grease particles and dirt adhered on parts of the device.

Other objects, advantages, and novel features of the invention will become more apparent from the following detailed description when taken in conjunction with the accompanying drawings.

BRIEF DESCRIPTION OF THE DRAWINGS

FIG. 5 is a side elevational view, partly in section, of a second embodiment of a smokeless barbecue device in accordance with the present invention, and FIG. 6 is side elevational view, partly in section, of the second embodiment of the smokeless barbecue device shown in FIG. 5 when in use.

DETAILED DESCRIPTION OF THE PREFERRED EMBODIMENTS

Figure 1:
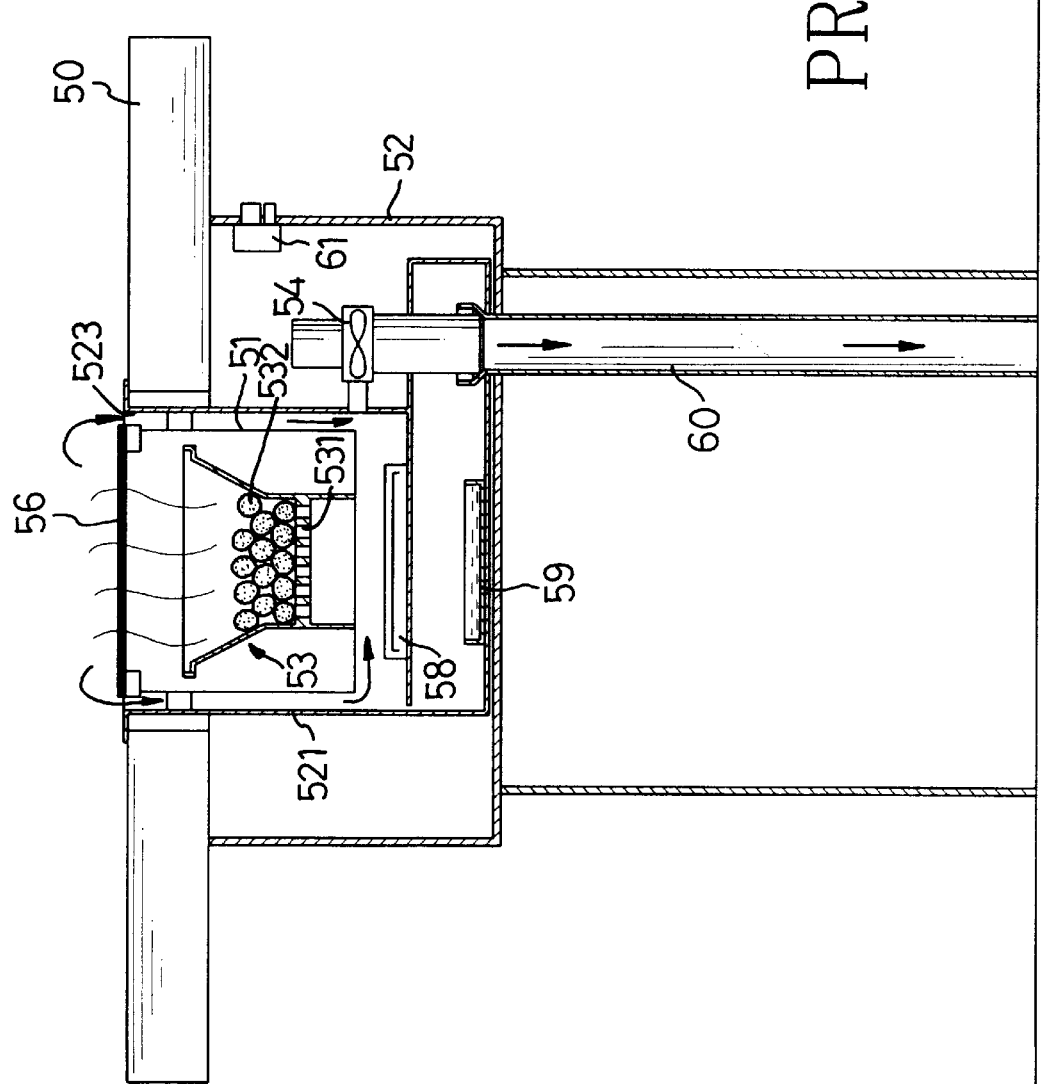
FIG. 1 is a side elevational view, partly in section, of a conventional smokeless barbecue device.
Figure 2:
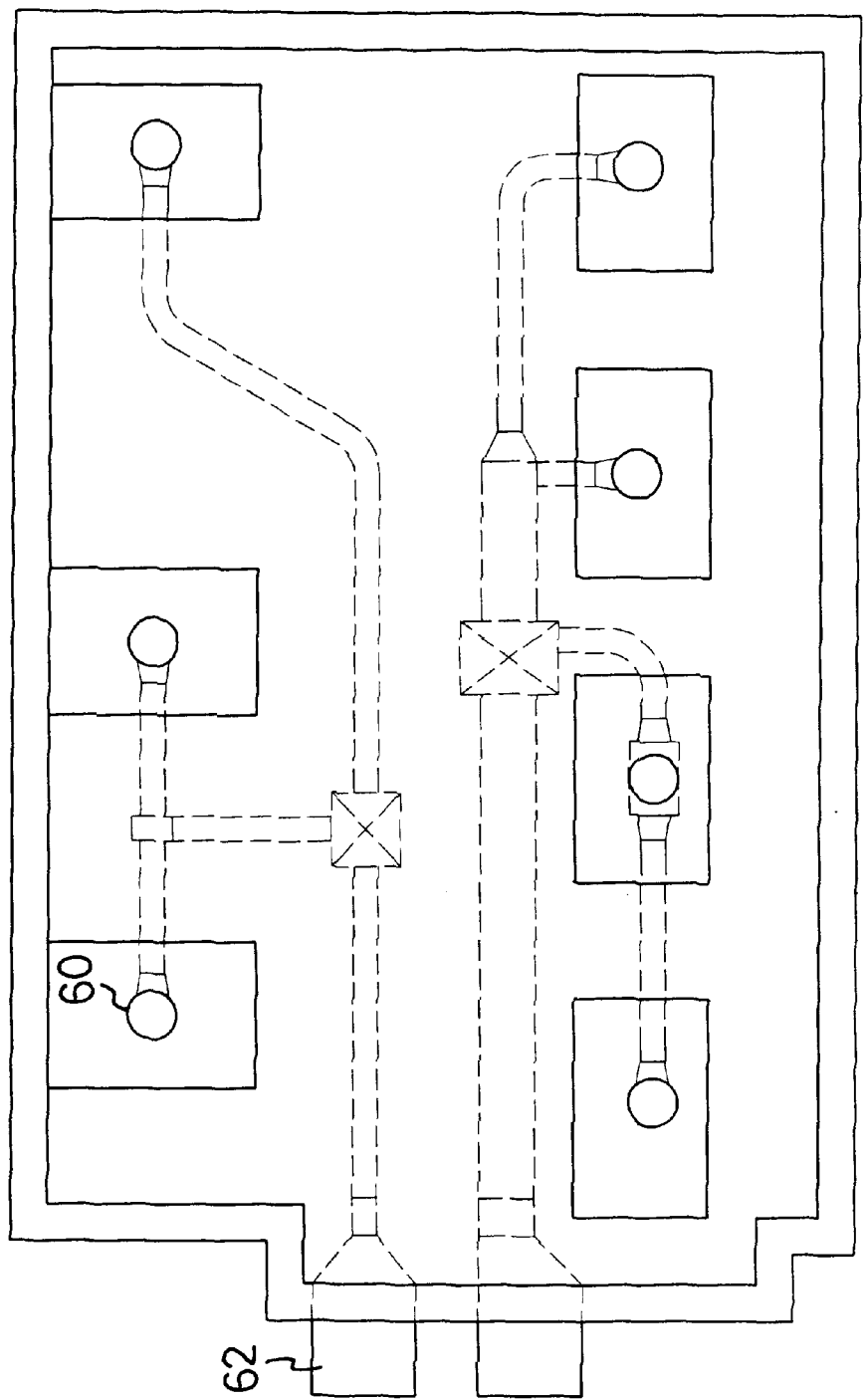
FIG. 2 is an illustrative view to show pipes disposed underground cooperated with the conventional smokeless barbecue device.
Figure 3:
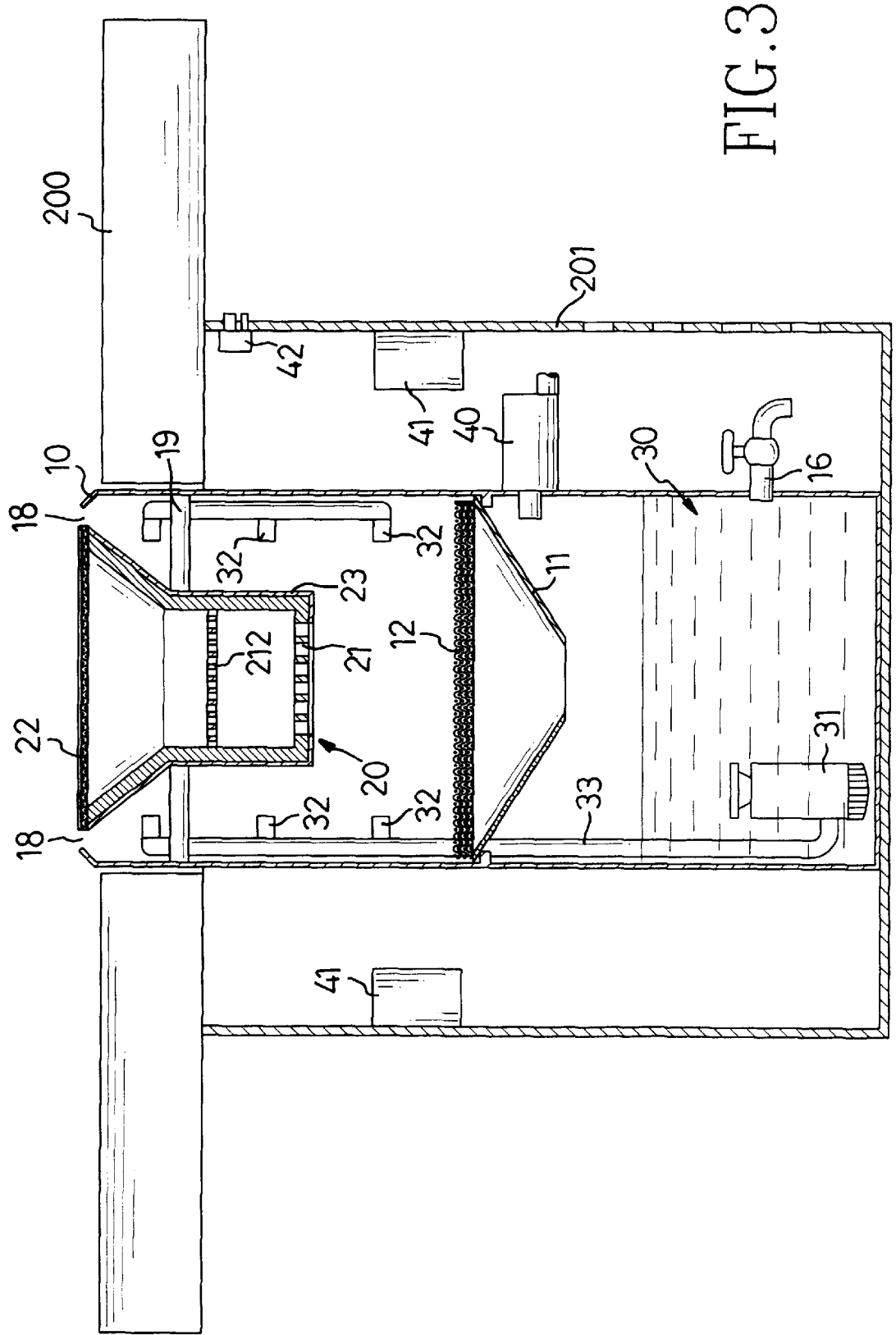
FIG. 3 is a side elevational view, partly in section, of a first embodiment of a smokeless barbecue device in accordance with the present invention.
Figure 4:
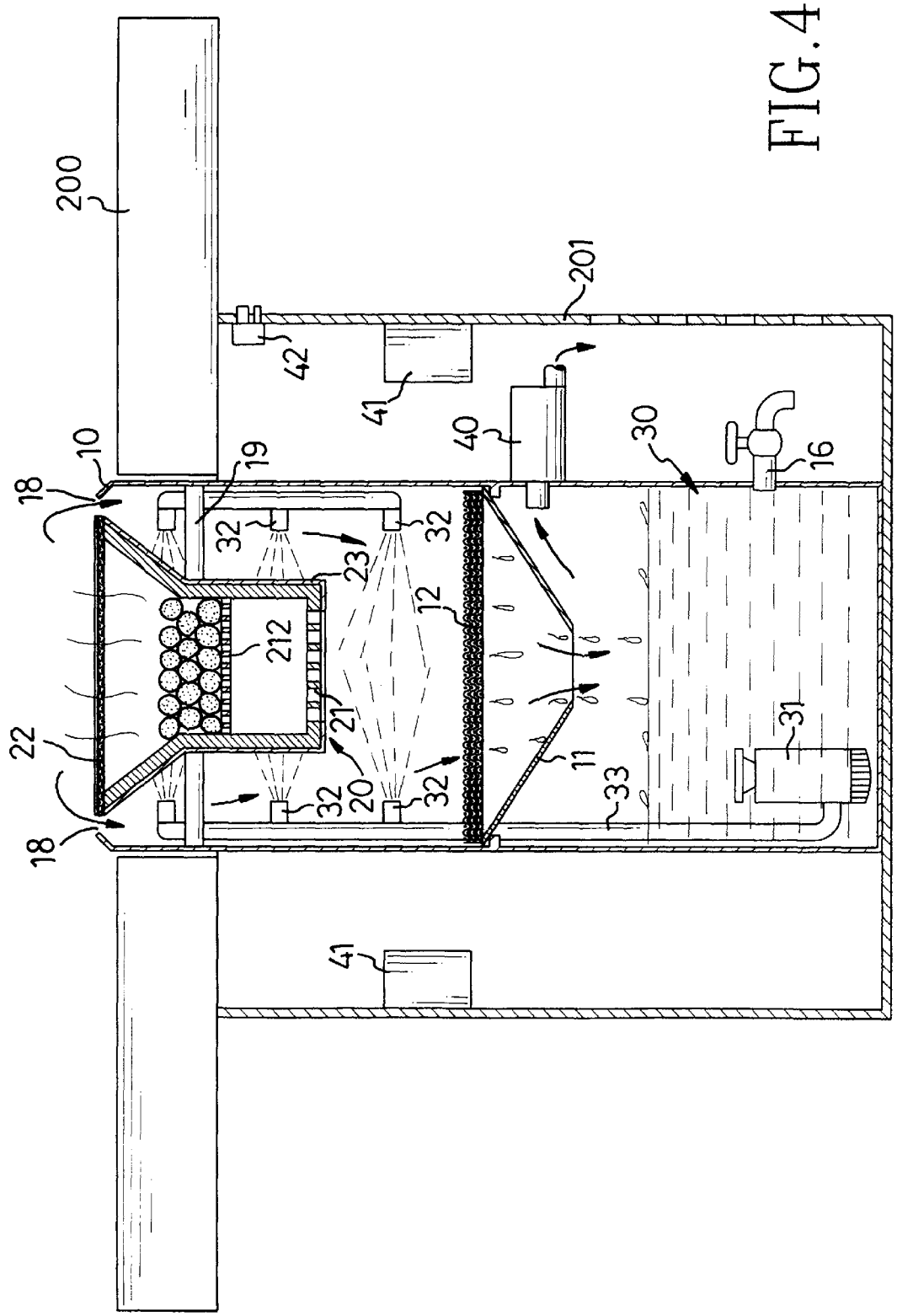
FIG. 4 is side elevational view, partly in section, of the first embodiment of the smokeless barbecue device shown in FIG. 3 when in use.

Referring to the drawings and initially to FIGS. 3 and 4, a smokeless barbecue device in accordance with the present invention generally includes a casing 10 disposed in a table 200 and having an open top within which a food processing means 20 is fixedly disposed by a supporting frame 19 in the casing 10. An annular space 18 is defined between a periphery defining the open top of the casing 10 and the food processing means 20. The food processing means 20 has a divergent upper portion and a tubular lower portion, and a water-proof outer casing 23 mounted to an outer periphery thereof. A coal supporting member 212 is transversely disposed in the tubular lower portion and a grill 22 is disposed above the coal supporting member 212 and supported on the divergent upper portion. A plurality of apertures 21 are defined in a bottom of the food processing means 20.

A water tank 30 is disposed in the casing 10 and located below the food processing means 20. A pump 31 is disposed in the water tank 30 and has at least one pipe 33 extending therefrom which has a plurality of sprays 32 disposed thereto so that water in the water tank 30 is sprayed from the sprays 32 via the pipe 33 when the pump 31 is actuated. A valve means, such as a faucet 16, is disposed to the water tank 30.

A meshed member 12 is transversely disposed in the casing 10 and located below the food processing means 20. The meshed member 12 includes a plurality of sheets and each of the sheets has a plurality of orifices defined therethrough. A funnel member 11 extends from an underside of the meshed member 12. The sprays 32 are located above the meshed member 12 and around the food processing device 20.

At least one ventilator 40 is disposed to the casing 10 and located below the funnel member 11. A frame 201 is disposed below the table 200 and receives the casing 10 therein, a switch 42 is disposed to the frame 201 and controls the ventilator 40. The frame 201 further has two odor removers 41 disposed to an inner periphery thereof so as to remove bad smell.

When the barbecue device is in use, smoke emanating from coals burning on the cool supporting member 212 is sucked by the ventilator 40 via the annular space 18 and water is sprayed from the sprays 32 to condense and collect grease and carbon particles in the smoke to effectively reduce smoke flowing above the table 200. The water sprayed from the sprays 32 forms a water screen on the meshed member 12 due to the surface tension of water. The orifices defined through the sheets of the meshed member 12 are so small that grease particles cannot drop directly through the orifices and will float on the water screen and both gradually flow toward the funnel members 11 in droplets into the water tank 30 because of gravity and a downward force generated from the ventilator 40. Because all the grease particles are mixed with water drops, air sucked by the ventilator 40 located below the funnel member 11 is free of grease particles. The funnel member 11 is used to prevent small droplets or moist from being sucked by the ventilator 40 when first formed on an underside of the meshed member 12 so as to ensure the air sucked by the ventilator 40 located below the funnel member 11 including less moisture.

FIGS. 5 and 6 show a second embodiment of the smokeless barbecue device, wherein a pump 31' is connected to the water tank 30 and located on an outside of the water tank 30 and connects to the sprays 32 so that water in the water tank is pumped to be sprayed therefrom. A first pipe 15 is disposed to the casing 10 and located above the meshed member 12 so as to add water into the water tank 30 thereby. A second pipe 17 is connected to the water tank 30 so that whenever the water level reaches an opening of the second pipe 17, grease floating on the water in the water tank 30 will flow out through the second pipe 17. The second pipe 17 can be connected to a filter to perform necessary processes to deal with the grease in the water.

The smokeless barbecue device reduces grease particles existing in the exhausted air sucked by the ventilator 40 and collects the grease particles on the water in the water tank 30 so that all the piping of the device can be maintained in a clean state. It is to be noted that the food processing means 20 can be cooperated with other known heating means such as a gas stove, electrical heating stove or infrared heating device.

Although the invention has been explained in relation to its preferred embodiment, it is to be understood that many other possible modifications and variations can be made without departing from the spirit and scope of the invention as hereinafter claimed.

What is claimed is:

1. A smokeless barbecue device comprising:

a casing having an open top within which a food processing means is fixedly disposed;

a water tank disposed below said food processing means and having a pump connected thereto, at least one pipe extending from said pump and having a plurality of sprays disposed thereto so that water in said water tank is sprayed from said sprays via said pipe, a valve means disposed to said water tank;

a meshed member transversely disposed in said casing and located below said food processing means, said sprays located above said meshed member, and at least one ventilator disposed to said casing and a funnel member extending from an underside of said meshed member, and said at least one ventilator located below said funnel member.

2. The device as claimed in claim 1 wherein said pump is disposed to an outside of the water tank.

3. The device as claimed in claim 1 wherein said pump is disposed in said water tank.

4. The device as claimed in claim 1 wherein said food processing means includes a coal supporting member and a grill disposed above said coal supporting member.

5. The device as claimed in claim 1 wherein said casing has an open top so as to receive said food processing means therein.

6. The device as claimed in claim 5 wherein an annular space is defined between a periphery defining said open top of said casing and said food processing means.

7. The device as claimed in claim 1 wherein said meshed member includes a plurality of sheets and each of said sheets has a plurality of orifices defined therethrough.

8. The device as claimed in claim 1 wherein said food processing means has a water-proof outer casing mounted to an outer periphery thereof.

* * * * *